United States Patent [19]

Nomura et al.

[11] 4,209,246
[45] Jun. 24, 1980

[54] FILM WINDING MECHANISM

[75] Inventors: Katsuhiko Nomura, Kawagoe; Hirao Monde, Tokyo, both of Japan

[73] Assignee: Asahi Kogaku Kogyo Kabushiki Kaisha, Tokyo, Japan

[21] Appl. No.: 939,610

[22] Filed: Sep. 5, 1978

[30] Foreign Application Priority Data

Sep. 16, 1977 [JP] Japan ............................ 52-124685[U]

[51] Int. Cl.$^2$ ....................... G03B 17/42; G03B 19/12
[52] U.S. Cl. ...................................... 354/153; 354/206
[58] Field of Search ................ 354/152, 153, 204–206, 354/212, 213

[56] References Cited

U.S. PATENT DOCUMENTS

| 2,511,215 | 6/1950 | Mihalyi | 354/205 |
| 3,221,626 | 12/1965 | Fuketa | 354/153 |
| 3,580,154 | 5/1971 | Ettischer | 354/153 |
| 4,003,268 | 1/1977 | Shimizu | 354/213 X |
| 4,047,208 | 9/1977 | Kawaguchi | 354/213 X |

*Primary Examiner*—John Gonzales
*Attorney, Agent, or Firm*—Sughrue, Rothwell, Mion, Zinn and Macpeak

[57] ABSTRACT

A camera winding mechanism for advancing the film and loading the shutter has a stop mechanism to prevent over rotation of the film sprocket shaft. In one embodiment a frictional brake ring mounted on the shaft engages a protrusion on the mirror charge lever to inhibit rotation of the sprocket when the film advance lever has reached the limit of travel. In a second embodiment, a pawl element is used to engage the protrusion.

10 Claims, 4 Drawing Figures

F I G. 1
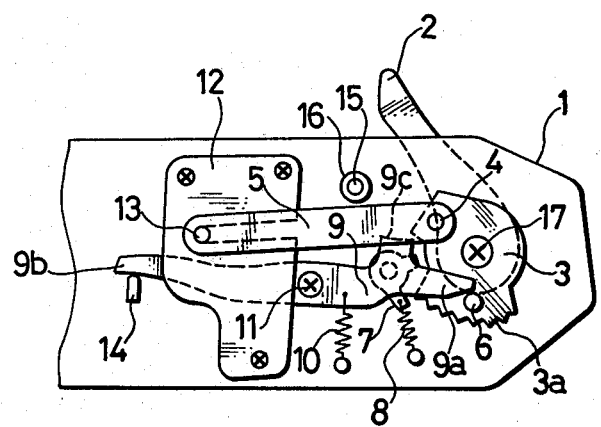
F I G. 2
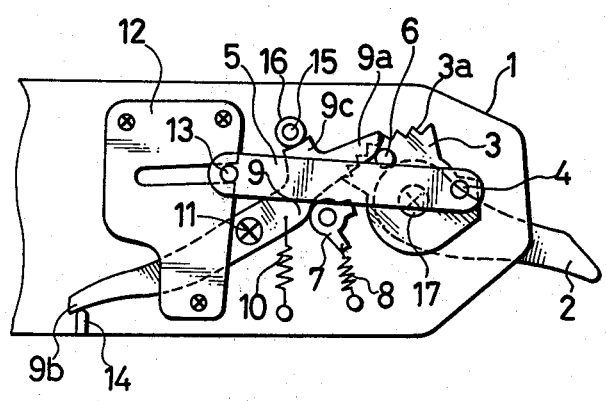

FILM WINDING MECHANISM

BACKGROUND OF INVENTION

In a camera of a type using perforated film, control of the winding of film is effectuated by rotation of a sprocket. Winding of the shutter and the film is carried out in a one stop operation by winding of a winding member and the rotation of the sprocket is stopped by an antireversal-rotation mechanism and by friction of shafts when the winding operation has been completed. However, generally a locking mechanism for locking the movement of the film in its feeding direction is not provided in such mechanisms. Therefore, if a rotating force is externally applied to the sprocket, the sprocket can freely rotate.

Accordingly, when the film is quickly wound, sometimes the film will over-run slightly as a consequence of the initial forces of the sprocket and the spool. As a result, the distance between adjacent picture frames becomes nonuniform. This drawback has been eliminated by this invention as will become apparent from the following description of the preferred embodiment and drawings that follow.

SUMMARY OF INVENTION

It is an object of this invention to provide a system that will prevent over rotation of a film winding sprocket in a camera system.

It is another object of this invention to define a system for uniformly advancing film in a camera having a winding mechanism for simultaneously advancing film and loading the shutter mechanism.

Still another object of this invention is to define a system where film is evenly advanced without introducing additional complicating elements into the camera mechanism.

These and other objects of this invention are accomplished by using a stop mechanism on the film sprocket shaft. The mirror charge lever has a protrusion that engages the stop mechanism to prevent further motion when a full winding cycle of the winding lever has been completed. Various types of stop mechanisms can be used such as frictional or gear type elements.

BRIEF DESCRIPTION OF THE DRAWINGS

FIG. 1 is a bottom view showing the winding section of a camera according to one embodiment of this invention with the winding operation to be started;

FIG. 2 is also a bottom view showing a state of the winding section when the winding operation has been completed and the winding lever is about to be restored.

DESCRIPTION OF THE PREFERRED EMBODIMENT

Figure 3:
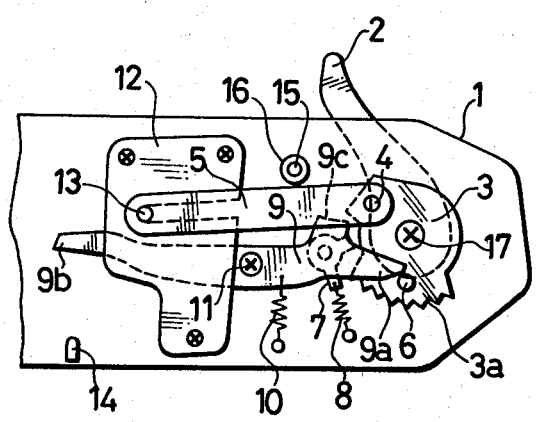
FIG. 3 shows the winding section when the winding operation has been completed and the winding lever has been restored.

Referring now to FIG. 1, the winding section of a camera is depicted as viewed from the bottom, according to a first embodiment of the invention. In FIG. 1, reference numeral 1 designates a camera body, and reference numeral 2 designates a winding lever which is connected to a lower winding plate 3 through a shaft 17.

A shutter charge plate 5 is loosely and rotatably supported by pin 4 embedded in the lower winding plate 3. The shutter charge plate 5 is provided with a pin 13 at the other end, that engages a groove formed in a guide plate 12. The guide plate 12 is secured to the camera body as shown.

The shutter charge plate 5 reciprocates by rotation of the winding lever 2 to charge a shutter mechanism (not shown). A ratchet pawl 7 is set at a predetermined position by means of a spring 8, but is movable to the right and left. The ratchet pawl 7 engages ratchet teeth 3a on the lower winding plate 3 to prevent reverse rotation of the winding lever 2 while it is being rotated in the forward direction (clockwise). A pin 6 is fixedly secured to the lower winding plate 3. The pin 6 engages one end portion 9a of a mirror charge lever 9 which is rotatably supported by a shaft 11 and is biased for clockwise rotation by spring 10.

The mirror charge lever 9 is positioned by the corresponding rotation of the winding lever 2 and as a result, a mirror operating lever 14 arranged in a plane perpendicular to the swinging plane is charged by the other end portion 9b of the mirror charge lever 9.

As the winding lever 2 is rotated clockwise through a predetermined angle as shown in FIG. 2, a sprocket shaft 15 is turned by a gear (not shown) operated in association with the winding lever 2, so that the film is advanced one picture frame. With the advancement of the winding lever 2, or when a predetermined rotation has been completed to feed the film, the film may over-run by the inertial forces of the gear, sprocket and film. In order to eliminate this difficulty, a protrusion 9c is provided on the mirror charge lever 9. A brake ring 16 made of a material having a high frictional coefficient (for instance synthetic rubber) is mounted, or frictionally fitted over the sprocket shaft 15. The protrusion 9c is brought into contact with the brake ring 16 to push the latter against the elastic force of the brake ring 16 immediately before the completion of the winding operation. This will stop the rotation of the sprocket shaft 15. Hence, any tendency for over-run of the film will be prevented.

FIG. 3 shows a case where the winding lever 2 is restored after the completion of the winding operation. As shown in the figure, the mirror operating lever has been charged and is positioned for mirror release.

Figure 4:
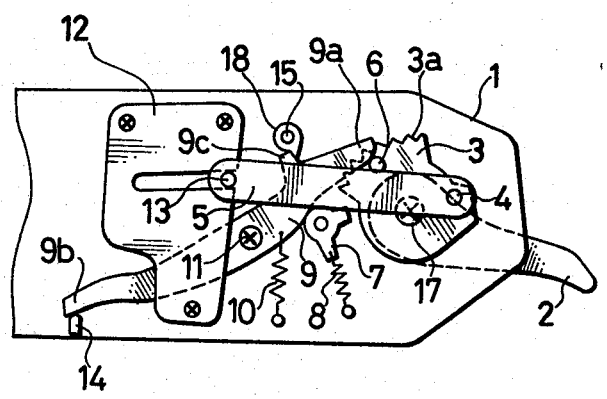
FIG. 4 is a bottom view showing the winding section of a camera in accordance with a second embodiment of this invention, in which the winding operation has been completed and the winding lever is about to be restored.

A second preferred embodiment of this invention is shown in FIG. 4 in which the sprocket shaft 15 is modified to have a pawl 18. The pawl 18 is configured to engage the protrusion 9c of the mirror charge lever 9. In this embodiment, when the winding operation is completed as shown in FIG. 4, advancement of the sprocket shaft 15 is inhibited to prevent over-run of the film.

As is apparent from the above description, in a camera of a type where the shutter and the film are wound by one operation of the winding member, any tendency for an over-run rotation of the sprocket can be positively prevented without providing additional complicating components for the camera.

It is apparent that modifications of the invention are possible without departing from the scope of this invention.

We claim:

1. A camera film winding mechanism comprising: A camera having a movable mirror, a winding lever rotatably mounted on said camera for movement to advance film, a film winding sprocket means to receive film as it is wound, loading means responsive to movement of said lever to load said mirror for subsequent movement and locking means responsive to said loading means to block the movement of said winding sprocket means when said mirror is loaded.

2. The mechanism of claim 1 wherein said means to load said mirror comprises a charge lever, said charge lever having a protrusion thereon, said locking means comprising a brake ring mounted on said winding sprocket means whereby, when said charge lever is rotated by movement of said winding lever said protrusion will abut against said brake ring preventing further motion of said winding sprocket means.

3. The mechanism of claim 2 wherein said winding lever further comprises a series of ratchet teeth said teeth engaging said charge lever to rotate it as said winding lever is rotated.

4. The mechanism of claim 3 further comprising a shutter charge plate, said plate movable in response to movement of said winding lever to charge a shutter mechanism in said camera.

5. The mechanism of claim 4 further comprising means to effectuate linear movement of said charge plate in response to rotation of said winding lever.

6. The mechanism of claim 1 wherein said loading means comprises a charge lever, said charge lever having a protrusion thereon, said locking means comprising a pawl member mounted on said winding sprocket means whereby, when said charge lever is rotated by movement of said winding lever said protrusion will engage said pawl preventing further motion of said winding sprocket means.

7. The mechanism of claim 6 wherein said winding lever further comprises a series of ratchet teeth, said teeth engaging said charge lever to rotate it as said winding lever is rotated.

8. The mechanism of claim 7 further comprising a shutter charge plate, said plate movable in response to movement of said winding lever to charge a shutter mechanism in said camera.

9. The mechanism of claim 8 further comprising means to effectuate linear movement of said charge plate in response to rotation of said winding lever.

10. The mechanism of claim 9 further comprising means to bias the movement of said charge lever in one direction.

* * * * *